(No Model.)
M. R. DAVIS.
SHAFT COUPLING.
No. 263,488. Patented Aug. 29, 1882.
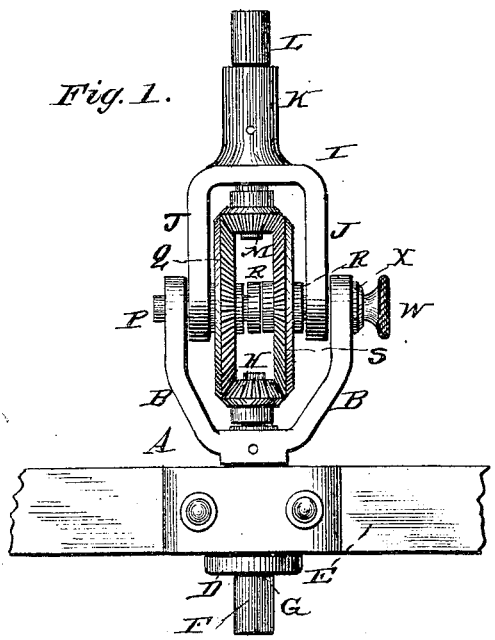
Fig. 1.
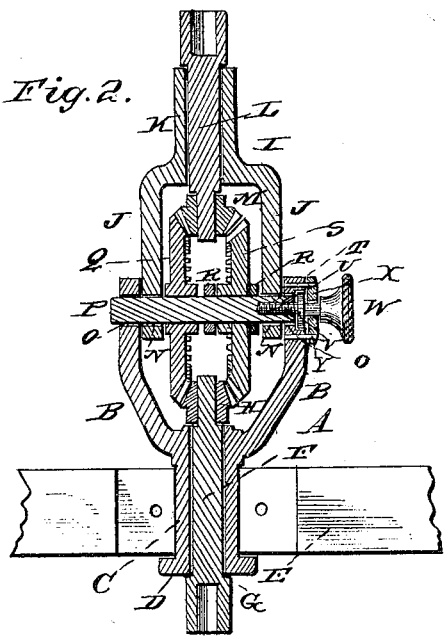
Fig. 2.
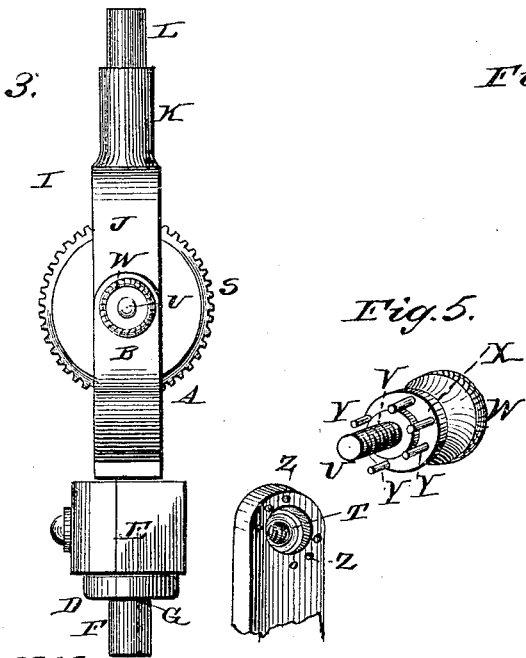
Fig. 3.
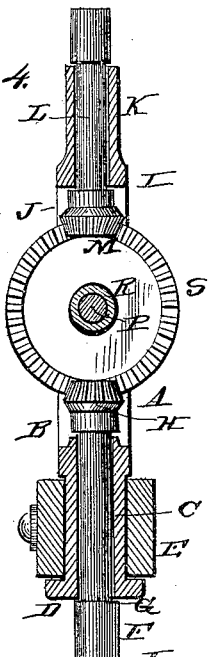
Fig. 4.
Fig. 5.
Witnesses:
Inventor:

UNITED STATES PATENT OFFICE.

MICAJAH R. DAVIS, OF PINK HILL, TEXAS.

SHAFT-COUPLING.

SPECIFICATION forming part of Letters Patent No. 263,488, dated August 29, 1882.

Application filed July 15, 1882. (No model.)

*To all whom it may concern:*

Be it known that I, MICAJAH R. DAVIS, of Pink Hill, in the county of Grayson and State of Texas, have invented certain new and useful Improvements in Shaft-Couplings; and I do hereby declare that the following is a full, clear, and exact description of the invention, which will enable others skilled in the art to which it appertains to make and use the same, reference being had to the accompanying drawings, which form a part of this specification.

This invention relates to couplings for shafts and the like, and has for its object to provide a simple, durable, inexpensive, and efficient means by which the shaft-rods can readily be adjusted at any desired relative angle.

In the drawings, Figure 1 is a front elevation of the coupling; Fig. 2, a longitudinal sectional view thereof; Fig. 3, a side elevation; Fig. 4, another longitudinal sectional view; Fig. 5, a detail view, in perspective, of the set-screw device.

Referring by letter to the drawings, A designates a substantially U-shaped end bracket, comprising sides B B and a cylindrical shank, C, having a circumferential flange or shoulder, D, for retaining it in position, the shank being arranged in bearings in the pillow-block E, which is fixed or anchored, as desired. In shank C are formed bearings for a rod or shaft, F, having a shoulder, G, and carrying a bevel-pinion, H, on its inner end. I is a corresponding ∩-shaped bracket, comprising sides J J and shank K, in the latter being formed bearings for a rod or shaft, L, carrying at its inner end a bevel-pinion, M. The brackets A and I are provided in the ends of their sides with openings N N O O, respectively, through which is passed a transverse connecting-shaft, P, carrying a bevel-gear wheel, Q, and fixed collars R R, between which latter is journaled a bevel-gear wheel, S.

Normally the above-enumerated miter-gear meshes, and thus communicates motion from shaft to shaft; but to provide for drawing the wheel S out of gear, so that the re-adjustment at any desired angle of the two brackets can be effected, one end of shaft P is formed with a screw-threaded hole, T, in which works a set-screw, U, having an annular flange or shoulder, V, and the usual milled head, W. Between the latter and former is adjusted an annular disk, X, which is provided with pins Y, entering holes Z in bracket A to prevent the disk from turning. Thus by manipulating screw U the shaft P is moved to draw wheel S from engagement. Then the brackets may be adjusted to the desired angle and the screw tightened to throw the wheel S into engagement, and to secure the brackets together.

The operation and advantages of my invention will be readily understood.

The device is simple and convenient, and operates with but little friction.

I claim and desire to secure by Letters Patent—

1. The combination, with the bracket A, having bearings for the rod or shaft carrying a bevel-pinion, of the bracket I, having bearings for a like shaft, carrying also a bevel-pinion, and the transverse connecting-shaft carrying a bevel-gear wheel, Q, and a like movable gear-wheel, S, with means for adjusting wheel S and retaining the brackets together, substantially as set forth.

2. The combination, with the substantially U-shaped bracket having bearings for the rod or shaft, carrying the bevel-pinion, and the corresponding ∩-shaped bracket carrying a like pinioned shaft, openings being formed in the ends of each bracket, of the movable transverse connecting-shaft carrying bevel-gear wheels Q S, and having a screw-threaded hole in one end, in which works a set-screw, substantially as set forth.

3. The combination, with the two brackets and the transverse connecting-shaft having a screw-threaded hole in one end, of the set-screw having an annular shoulder or flange, and the annular disk provided with the securing-pins, substantially as set forth.

4. The combination, with the brackets carrying the pinioned shafts, and the transverse connecting-shaft having fixed collars R R, and bevel-gear wheels Q S, and a screw-threaded hole in one of its ends, of the flanged set-screw and the disk arranged thereon and provided with the securing-pins, substantially as set forth.

5. The combination, with the bolster having suitable bearings, of the substantially U-shaped bracket having a shank arranged therein, and provided with a shoulder and bearings for the pinioned shaft, the correspondingly-∩-shaped bracket carrying a like pinioned shaft, and the transverse connecting-shaft carrying two bevel-gear wheels, substantially as set forth.

In testimony that I claim the foregoing as my own I have hereto affixed my signature in presence of two witnesses.

MICAJAH READ DAVIS.

Witnesses:
J. F. YOUNG,
HORACE RANDOLPH.